(12) United States Patent
Ge et al.

(10) Patent No.: US 11,429,809 B2
(45) Date of Patent: Aug. 30, 2022

(54) IMAGE PROCESSING METHOD, IMAGE PROCESSING DEVICE, AND STORAGE MEDIUM

(71) Applicant: Beijing Sensetime Technology Development Co., Ltd., Beijing (CN)

(72) Inventors: Yixiao Ge, Beijing (CN); Dapeng Chen, Beijing (CN); Hongsheng Li, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 42 days.

(21) Appl. No.: 17/077,251

(22) Filed: Oct. 22, 2020

(65) Prior Publication Data
US 2021/0089824 A1    Mar. 25, 2021

Related U.S. Application Data

(63) Continuation of application No. PCT/CN2019/119180, filed on Nov. 18, 2019.

(30) Foreign Application Priority Data

Sep. 24, 2019    (CN) .......................... 201910905445.7

(51) Int. Cl.
G06K 9/62        (2022.01)
G06N 3/08        (2006.01)
G06V 10/40       (2022.01)

(52) U.S. Cl.
CPC ......... *G06K 9/6256* (2013.01); *G06K 9/6215* (2013.01); *G06K 9/6267* (2013.01); *G06N 3/08* (2013.01); *G06V 10/40* (2022.01)

(58) Field of Classification Search
None
See application file for complete search history.

(56) References Cited

U.S. PATENT DOCUMENTS 6,128,609 A      10/2000 Rose
2018/0068218 A1*  3/2018 Yoo ...................... G06K 9/6232
(Continued)

FOREIGN PATENT DOCUMENTS

CN        105894046 A       8/2016
CN        108197670 A       6/2018
(Continued)

*Primary Examiner* — Leon Flores
(74) *Attorney, Agent, or Firm* — BakerHostetler

(57) ABSTRACT

The present disclosure discloses an image processing method and related device thereof. The method includes: acquiring an image to be processed; and performing a feature extraction process on the image to be processed using a target neural network so as to obtain target feature data of the image to be processed, wherein parameters of the target neural network are time average values of parameters of a first neural network which is obtained from training under supervision by a training image set and an average network, and parameters of the average network are time average values of parameters of a second neural network which is obtained from training under supervision by the training image set and the target neural network. A corresponding device is also disclosed. Feature data of image to be processed are obtained via the feature extraction process performed on the image to be processed.

20 Claims, 6 Drawing Sheets

(56) References Cited

U.S. PATENT DOCUMENTS

2019/0042945 A1    2/2019  Majumdar et al.
2019/0325299 A1*  10/2019  Oliveira Pinheiro ........................
                                                           G06N 3/0472

FOREIGN PATENT DOCUMENTS

| CN | 110188829 A | 8/2019 |
| CN | 110210535 A | 9/2019 |
| CN | 110647938 A | 1/2020 |
| JP | 2006-079279 A | 3/2006 |
| TW | 201327397 A | 7/2013 |
| TW | 201843654 A | 12/2018 |
| WO | WO 2019/001481 A1 | 1/2019 |
| WO | WO 2019/091464 A1 | 5/2019 |

* cited by examiner

US 11,429,809 B2

IMAGE PROCESSING METHOD, IMAGE PROCESSING DEVICE, AND STORAGE MEDIUM

CROSS-REFERENCE TO RELATED APPLICATION

The present application is a continuation of and claims priority to PCT Application No. PCT/CN2019/119180, filed on Nov. 18, 2019, which claims priority to Chinese Patent Application No. 201910905445.7, filed with the Chinese National Intellectual Property Administration (CNIPA) on Sep. 24, 2019 and entitled "Image Processing Methods and Related Device". All the above-referenced priority documents are incorporated herein by reference.

TECHNICAL FIELD

The present disclosure relates to the technical field of image processing, especially to an image processing method, an image processing device and a non-transitory computer-readable storage medium.

BACKGROUND

Neural networks have been widely used in various image recognition tasks (such as pedestrian re-recognition and image classification) in recent years due to their powerful performances. However, the training of neural networks requires a large amount of labeled data. The training of neural networks is accomplished by unlabeled data with a manner of unsupervised learning. Traditional unsupervised learning method recognizes an unlabeled image on a target domain by a neural network trained on a source domain, adds labels to the unlabeled image on the target domain, then uses the labels to supervise the neural network trained on the source domain, and adjusts parameters of the neural network trained on the source domain, thereby obtaining the neural network applied to the target domain.

SUMMARY

The present disclosure provides a technical solution of image processing.

As for the first aspect, the present disclosure provides an image processing method including: acquiring an image to be processed; and performing a feature extraction process with a target neural network on the image to be processed, to obtain target feature data of the image to be processed, wherein parameters of the target neural network are time average values of parameters of a first neural network which is obtained from training under supervision by a training image set and an average network, and parameters of the average network are time average values of parameters of a second neural network which is obtained from training under supervision by the training image set and the target neural network.

As for the second aspect, the present disclosure provides an image processing device comprising: an acquiring unit for acquiring an image to be processed; and a feature extraction processing unit for performing a feature extraction process with a target neural network on the image to be processed so as to obtain target feature data of the image to be processed, wherein parameters of the target neural network are time average values of parameters of a first neural network which is obtained from training under supervision by a training image set and an average network, and parameters of the average network are time average values of parameters of a second neural network which is obtained from training under supervision by the training image set and the target neural network.

As for a third aspect, the present disclosure provides a processor for implementing the method as described in the first aspect and any possible implementation thereof.

As for a fourth aspect, the present disclosure provides an electronic apparatus comprising: a processor, a transmission device, an input device, an output device and a memory for storing computer program codes containing computer instructions, wherein the electronic apparatus is configured to implement the method as described in the first aspect and any possible implementation thereof when the processor executes the computer instructions.

As for a fifth aspect, the present disclosure provides a computer-readable storage medium storing computer program thereon, wherein the computer program comprises program instructions which cause a processor of an electronic apparatus to implement the method as described in the first aspect and any possible implementation thereof when being executed by the processor.

As for a sixth aspect, the present disclosure provide a computer program product comprising instructions; the computer program product causes a computer to implement the method as described in the first aspect and any possible implementation thereof when running on the computer.

It should be understood that the general description above and the detailed description below are only illustrative and explanatory, without limiting the present disclosure.

BRIEF DESCRIPTION OF THE DRAWINGS

In order to more clearly illustrate the technical solutions in the embodiment or background of the present disclosure, drawings to be used in the embodiment or background of the present disclosure will be explained below.

The drawings herein are incorporated into the specification and constitute a part thereof. These drawings show embodiment according to the present disclosure, and are used together with the description for explaining the technical solutions of the present disclosure.

DETAILED DESCRIPTION

Figure 1:
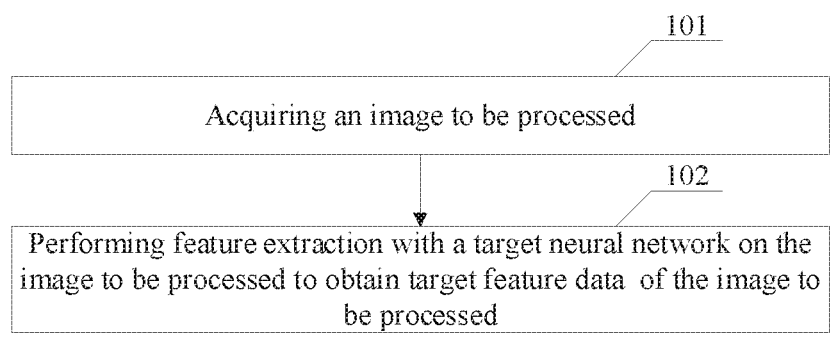
FIG. 1 is a flowchart of an image processing method provided according to an embodiment of the present disclosure.

For better understanding by one skilled in the art about the solution of the present disclosure, technical solutions in the embodiments of the present disclosure will be clearly and completely illustrated with reference to the drawings in the embodiments of the present disclosure. Obviously, the embodiments illustrated herein are merely a part of the embodiments of the present disclosure, rather than all of them. Based on the embodiments of the present disclosure, all other embodiments obtained by one skilled in the art without inventive contribution fall into the protection scope of the present disclosure.

The terms "first", "second", etc. in the specification, claims and the above drawings of the present disclosure are used to distinguish different objects, not to describe a specific order. In addition, the terms "include" and "having" and any variations thereof are intended to cover non-exclusive inclusions. For example, a process, a method, a system, a product, or an apparatus that includes a series of steps or units is not limited to the listed steps or units, but optionally includes steps or units that are not listed, or optionally also includes other steps or units inherent to these processes, methods, products or apparatuses. The term "and/or" in this text is just an association relationship describing associated objects, and indicates that there can be three relationships, for example, A and/or B, which means such three cases as: A exists alone, A and B exist at the same time, and B exists alone. In addition, the term "at least one" in this text means any one of the plurality or any combination of at least two of the plurality, for example, "including at least one of A, B and C" may refer to any one or more elements selected from the set consisting of A, B and C. The term "embodiments" in this text means that specific features, structures or characteristics described with reference to the embodiments may be included in at least one embodiment of the present disclosure. The appearance of the phrase in various places in the specification does not necessarily refer to the same embodiment, nor is an independent or preliminary embodiment mutually exclusive with other embodiments. One skilled in the art understands explicitly and implicitly that the embodiments described in this text can be combined with other embodiments.

Neural networks have been widely used in various image recognition tasks (such as pedestrian re-recognition and image classification) in recent years due to their powerful performances. The performance of neural network in these tasks highly depends on the effect of training on the neural networks, and the effect of training on the neural networks mainly depends on the number of training images for training the neural networks, namely, the effect of training on the neural networks would be better with more training images, and the effects of the trained neural networks carrying out the corresponding image recognition tasks would be better.

The training image refers to an image with label information (hereinafter referred to as a label). For example, when the task to be carried out is to classify the content in the image and to determine whether the content in the image is an apple, a banana, a pear, a peach, an orange or a watermelon, the above mentioned label information includes apple, banana, pear, peach, orange and watermelon. For another example, when the task to be carried out is pedestrian re-recognition, which is to recognize the identity of a person contained in the image, then the above mentioned label information includes identities of person (such as Zhang San, Li Si, Wang Wu, Zhou Liu, etc.).

The more accurate the label information of the training image is, the better the effect of training on the neural network will be. Therefore, the higher the matching degree between the labeled image for the training image and the real content of the training image is, the better the effect of training will be. For example, it would be incorrect if an image containing a pear is labeled as an apple. For another example, it also would be incorrect to label the image containing Zhang San as Li Si. Training images with incorrect label information will worsen the effect of training, so labeling the training images is mostly completed by a manner of manual labeling in traditional methods. However, when the number of training images is large, manual labeling will be inefficient and the labor cost will be high. Therefore, more and more people are training neural networks through unsupervised transfer learning, which is to apply neural networks trained with existing labeled images to unlabeled images, so as to reduce labor costs.

The tasks carried out by the neural network on the labeled images and those on the unlabeled images are correlated, and there is also a correlation between the labeled images and the unlabeled images. For example (Example 1), a large number of images (hereinafter referred to as images of place A) containing pedestrians are collected through the surveillance cameras of city A when it is cloudy, and identities of the pedestrians in the images of place A are labeled so as to obtain labeled data; a neural network a is trained using the labeled data, so that the trained neural network a can be used for recognizing the identities of pedestrians in the images collected at place A when it is cloudy. When it is required to recognize identities of pedestrians in images collected at place B, since high labor costs will be needed if a new neural network (such as neural network b) is trained using images obtained by labeling images collected at place B, parameters of the trained neural network a can be adjusted through unsupervised transfer learning so that the trained neural network a can be used for recognizing the identities of pedestrians in the images collected from place B. The tasks carried out by the neural network a on either the labeled images or the unlabeled images (images collected from place B) are both for recognizing identities of pedestrians, while both the labeled images and the unlabeled images are images containing pedestrians.

Although the labeled images and the unlabeled images are correlated, they are different, which makes it impossible to directly apply the neural network trained by labeled images to unlabeled images. Also take Example 1 as an example, all labeled data are images collected on a cloudy day, and images collected from place B include images collected on a cloudy day, images collected on a sunny day and images collected on a rainy day. Ambient brightness of images collected in different weathers varies, and different ambient brightness has a significant impact on the recognition accuracy of the neural network. For instance, a neural network trained by the images collected on a cloudy day may have low accuracy for recognizing identities of pedestrians in images collected on a sunny day. Besides, parameters (e.g. the shooting angle) of the surveillance camera in place A may be different from parameters of the surveillance camera in place B, and this will also cause the neural network to have different recognition accuracy for recognizing the identities of pedestrians in the images collected by different cameras. For example, the parameters of the surveillance camera in place A and parameters of the surveillance camera in place B are different, resulting in a poor accuracy for recognizing the identities of pedestrians in the images collected from place B by the neural network trained by the labeled data.

The set containing the above labeled images is called as a source domain, and the set containing the above unlabeled images is called as a target domain; then unsupervised transfer learning is a kind of neural network training method which applies a neural network trained on the source domain to the target domain.

Traditional unsupervised learning recognizes unlabeled images on a target domain by using a neural network trained on a source domain, adds a label (hereinafter referred to as a pseudo hard label) to unlabeled images on the target domain, supervises the neural network trained on the source domain with the pseudo hard label, and adjusts the parameters of the neural network trained on the source domain, so as to obtain a neural network applied to the target domain (hereinafter referred to as an application neural network). Due to the error in the pseudo hard label, the effect of supervising the neural network trained on the source domain through the pseudo hard label may be poor, which leads to a bad effect of feature extraction by the application neural network on the target domain, further leading to a bad application effect on the target domain (e.g. a low accuracy in recognizing pedestrians' identities). By using the technical solutions according to the embodiments of the present disclosure, it is possible to obtain, on the basis of the above traditional method, a neural network with a better effect of feature extraction on the target domain than the effect of feature extraction of the application neural network on the target domain, thereby improving the application effect on the target domain.

Before elaborating on the technical solutions according to embodiments of the present disclosure, a few concepts need to be defined first: 1. the most difficult intra-class feature data-two feature data with the minimum similarity among the feature data of images having the same label; 2. the most difficult outside-class feature data: two feature data with the maximum similarity among the feature data of images with different labels; 3. the most difficult intra-class feature data of the image in the feature data set: the most difficult intra-class feature data among the feature data of the image in the feature data set; 4. the most difficult outside-class feature data of the image in the feature data set; the most difficult intra-class feature data among the feature data of the image in the feature data set.

For example, suppose that the feature data of an image 1 is feature data 1, the feature data of an image 2 is feature data 2, the feature data of an image 3 is feature data 3, the feature data of an image 4 is feature data 4, and the feature data of an image 5 is feature data 5. The label of the image 1 is the same as that of the image 2 and that of the image 3, and the label of the image 1 is different from that of the image 4 or that of the image 5. If the similarity between the feature data 1 and the feature data 2 is smaller than the similarity between the feature data 1 and the feature data 3, then the feature data 3 is the most difficult intra-class feature data for the feature data 1. If the similarity between the feature data 1 and the feature data 4 is smaller than the similarity between the feature data 1 and the feature data 5, then the feature data 5 is the most difficult outside-class feature data for the feature data 1. Suppose that a feature data set 1 contains the feature data 1, the feature data 2, the feature data 3, the feature data 4 and the feature data 5, then the most difficult intra-class feature data for the image 1 in the feature data set 1 is the feature data 3, and the most difficult outside-class feature data of the image 1 in the feature data set 1 is the feature data 5.

Following is the description of the embodiments of the present disclosure with reference to the drawings in the embodiments of the present disclosure. Referring to FIG. 1, which is a flowchart of an image processing method according to the embodiments of the present disclosure.

101. Obtaining an image to be processed.

The execution subject in this embodiment can be terminals such as a server, a mobile phone, a computer, or a tablet computer. The image to be processed can be of any digital image. For example, the image to be processed may include a human object, wherein the image to be processed may include only a human face without a torso and limbs (hereinafter the torso and limbs are referred to as a human body), or may include only a human body, include no human body, or include only lower limbs or upper limbs. The present disclosure does not limit the area of human body specifically included in the image to be processed. For another example, the image to be processed may include animals. For another example, the image to be processed may include plants. The present disclosure does not limit the content contained in the image to be processed.

The way of acquiring an image to be processed may be receiving an image to be processed input by the user through an input component, wherein the input component includes: a keyboard, a mouse, a touch screen, a touch pad, an audio input device and the likes. It may also be receiving an image to be processed transmitted by a terminal, wherein the terminal includes a mobile phone, a computer, a tablet computer, a server and the likes. The present disclosure does not limit the way of acquiring the image to be processed.

102. Performing a feature extraction process on the image to be processed with a target neural network to obtain target feature data of the image to be processed.

The target neural network is a neural network with the function of extracting feature data from images. For example, the target neural network may be stacked by or composed of neural network layers such as convolution layers, pooling layers, normalization layers, fully connected layers, down-sampling layers, up-sampling layers, and classifiers according to a certain manner. The present disclosure does not limit the structure of the target neural network.

In a possible implementation, the target neural network includes multiple convolution layers and normalization layers, and convolution processing and normalization processing are sequentially performed on the image to be processed by the multiple convolution layers and normalization layers of the target neural network, so as to extract feature data of the image to be processed, thereby obtaining the target feature data.

As mentioned above, since the pseudo hard labels in conventional methods are obtained through a neural network trained on the source domain, by supervising the neural network trained on the source domain with the pseudo hard labels, the neural network trained on the source domain may become worse and worse during the training in a direction of learning badly, thereby leading to poor application effects for the neural network being applied on the target domain.

For example, a neural network trained on the source domain has a low recognition accuracy for Li Si, and the probability of recognizing images containing Li Si as others is high. An image a containing Li Si is input into the neural network trained on the source domain, and the obtained pseudo hard label is Wang Wu; then Wang Wu is used as the supervision data for supervising the output of the neural network trained on the source domain, and the parameters of the neural network trained on the source domain are adjusted. By adjusting the parameters, the neural network trained on the source domain is made so that the feature data extracted from the image a is close to the feature data for Wang Wu. For this, when the finally-obtained application neural network is used to recognize the image containing Li Si, the extracted feature data are all close to the feature data for Wang Wu, thereby causing a mis-recognition of Li Si as Wang Wu.

In view of the above shortcomings in the conventional method, the present disclosure relates to supervise the output of the application neural network with the output of another neural network (hereinafter referred to as a supervising neural network) trained on the source domain, so as to improve the application effects of the application neural network on the target domain. Although the application neural network and the supervising neural network are both neural networks trained on the source domain, they have different parameters, namely, the application neural network and the supervising neural network have different recognition accuracies for the identities of different people. For example (Example 2), the application neural network has a high recognition accuracy for Zhang San, but has a low recognition accuracy for Zhou Liu; while the supervising neural network has a low recognition accuracy for Zhang San, but has a high recognition accuracy for Zhou Liu.

Therefore, if the output of the application neural network and the output of the supervising neural network are used for a mutual supervision, namely, the output of the application neural network is used to supervise the supervising neural network, and the output of the supervising neural network is used to supervise the application neural network, then the supervision on the application neural network by the pseudo hard label can be replaced. However, the parameters of the application neural network and the parameters of the supervising neural network are updated at the same time during the training process of the mutual supervision, resulting in a higher and higher similarity between the output of the application neural network and the output of the supervising neural network (hereinafter this defect existing in the mutual supervision will be referred to as a correlation defect). In turn, during the training process of the mutual supervision, the supervising neural network learns the "disadvantages" of the application neural network (such as the recognition of Zhou Liu's identity by the application neural network in Example 2), and the application neural network learns the "disadvantages" of the supervising neural network (such as the recognition of Zhang San's identity by the supervising neural network in Example 2), resulting in a higher and higher similarity between the parameters of the application neural network and the parameters of the second neural network. In this way, it is impossible to optimize the parameters of the application neural network, thus the application effect of the application neural network on the target domain cannot be improved.

In view of the correlation defects existing in the training process of the mutual supervision, an embodiment of the present disclosure provides another training method which reduces the correlation between the application neural network and the supervising neural network by "isolating" the application neural network and the supervising neural network, so as to reduce the impact of correlation defects, thereby obtaining a target neural network which has a better effect on the target domain than the application neural network trained through mutual supervision. This training method includes: determining parameters of the above mentioned target neural network through time average values of parameters of a first neural network, then supervising a second neural network by the output of the target neural network, at the same time determining parameters of an average network through time average values of parameters of the second neural network, and supervising the first neural network by the output of the average network, thereby completing the training of the target neural network. Both the first neural network and the second neural network are neural networks trained on the source domain; and both of them are neural networks having the function of extracting feature data from images and classifying according to feature data. The structure of the first neural network and that of the second neural network may be the same or different, and the present disclosure gives no limit on this.

Figure 2:
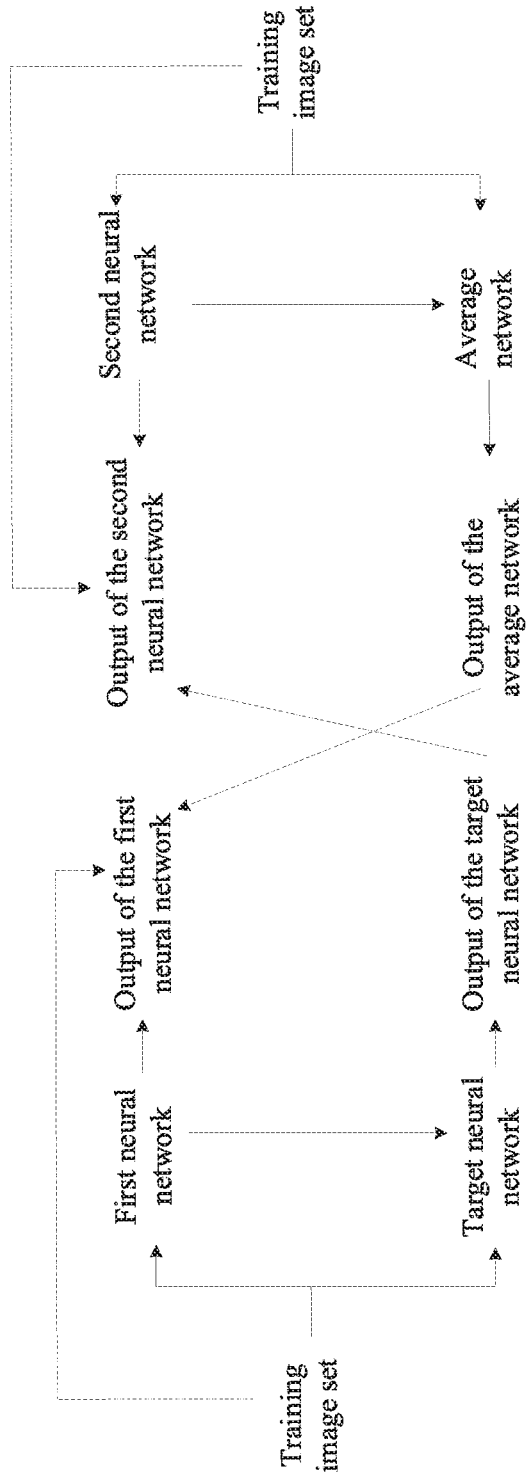
FIG. 2 is a diagram of a training method according to an embodiment of the present disclosure.

As shown in FIG. 2, parameters of a target neural network are time average values of parameters of a first neural network obtained from training under the supervision by a training image set and the average network, namely; i.e., labels of images in the training image set and the output of the average network are used as supervision data for supervising the output of the first neural network and the parameters of the first neural network are adjusted. Parameters of the average network are time average values of parameters of the second neural network obtained from training under the supervision by the training image set and the target neural network, namely, the labels of images in the training image set and the output of the target neural network are used as supervision data for supervising the output of the second neural network, and the parameters of the second neural network are adjusted.

The training image set is input into the first neural network, the second neural network, the target neural network and the average network individually. By supervising the first neural network and the second neural network to complete multiple cycles of training according to the supervision relationship shown in FIG. 2, parameters of the target neural network may be updated; the training stops once all of the four networks (including the first neural network, the second neural network, the target neural network and the average network) in FIG. 2 are converged.

During the training of the four networks in FIG. 2, parameters of these four networks will be updated each time a training cycle is completed, wherein parameters of the target neural network are time average values of parameters of the first neural network, which means that parameters of the target neural network are average values of the parameters of the first neural network in different training cycles, and parameters of the average network are time average values of parameters of the second neural network, which means that parameters of the average network are average values of the parameters of the second neural network in different training cycles.

It should be understood that the average values of the parameters of the first neural network in different training cycles reflect the average performance of the first neural network obtained from the completed training cycles, and a specific determination on the parameters of the target neural network may not be limited to a determination by calculating average values of the parameters of the first neural network in different training cycles. Similarly, a specific determination on the parameters of the average network may not be limited to a determination by calculating average values of the parameters of the second neural network in different training cycles.

In one possible implementation, a parameter of the target neural network can be determined by the formula below:

$$E^T(\gamma_1) = \alpha E^{T-1}(\gamma_1) + (1-\alpha)\gamma_1^T \qquad \text{Formula (1)}$$

Wherein: $E^T(\theta_1)$ is a parameter of the target neural network in the $T^{th}$ training cycle, $E^{T-1}(\gamma_1)$ is a parameter of the target neural network in the $(T-1)^{th}$ training cycle, $\gamma_1^T$ is a parameter of the first neural network in the $T^{th}$ training cycle, α is a natural number greater than or equal to 0 and less than 1, and $E^0(\gamma_1)=E^1(\gamma_1)=\gamma_1^1$.

In another possible implementation, parameters of the target neural network can be determined by calculating average values of the parameters of the first neural network in different training cycles. For example, suppose that a parameter of the first neural network before the training of the $k^{th}$ cycle is $E^k$ (θ), and that the parameter of the first neural network before the training of the $k^{th}$ cycle is $E^{k+1}$ (θ), then the parameter of the target neural network before the training of the $(k+1)^{th}$ cycle is as follows: $.E^k$ (σ)=$(E^k(θ)+E^{k+1}(θ))/2$.

Similarly, parameters of the average network can be determined through the above two possible ways.

During the training process of the method according to an embodiment of the present disclosure, parameters of the first neural network are obtained through a supervised training, namely, a loss of the first neural network and a loss of the second neural network are respectively determined from supervisions with the supervision data, a gradient of back propagation of the first neural network is determined based on the loss of the first neural network, then the gradient is propagated through the back propagation so as to update parameters of the first neural network. Similarly, parameters of the second neural network are also updated by the back propagation of the gradient. Neither the parameters of the target neural network nor the parameters of the average network are updated by the back propagation of the gradient, instead, the parameters of the target neural network nor the parameters of the average network are respectively determined according to average values of the parameters of the first neural network in different training cycles and average values of the parameters of the second neural network in different training cycles. Therefore, parameters of the target neural network and parameters of the average network are updated slower than parameters of the first neural network and parameters of the second neural network, namely, the similarity between the output of the target neural network and the output of the second neural network is low, and the similarity between the output of the average network and the output of the first neural network is low. In this way, the output of the target neural network and the output of the average network are respectively used to supervise the second neural network and the first neural network, so that the second neural network can learn the "advantages" of the target neural network (i.e. "advantages" of the first neural network) and the first neural network can learn the "advantages" of the average network. Since parameters of the target neural network can reflect an average performance of the first neural network obtained from the completed training cycles, and parameters of the average network can reflect an average performance of the second neural network obtained from the completed training cycle, the learning of the "advantages" of the target neural network by the second neural network means the leaning of the "advantages" of the first neural network by the second neural network, and the learning of the "advantages" of the average network by the first neural network means the leaning of the "advantages" of the second neural network by the first neural network. Furthermore, parameters of the target neural network are determined according to the time average values of parameters of the first neural network, so that the target neural network obtained from training has a better effect on the target domain than the application neural network. The above mentioned "advantages" refers to a high recognition accuracy for a certain classification or individual by the neural network, such as the recognition of Zhou Liu's identity by an application neural network and the recognition of Zhang San's identity by a supervising neural network in Example 2.

In this embodiment, parameters of the target neural network and parameters of the average network are respectively obtained through determinations of the time average values of parameters of the first neural network and the time average values of the second neural network, and then the output of the target neural network is used to supervise the second neural network, and the output of the average network is used to supervise the first neural network, so as to train the target neural network, thereby enhancing the training effect. Furthermore, when the target neural network is used for related recognition tasks on the target domain, more informative target feature data can be extracted, wherein the information can improve the recognition accuracy on the target domain.

Figure 3:
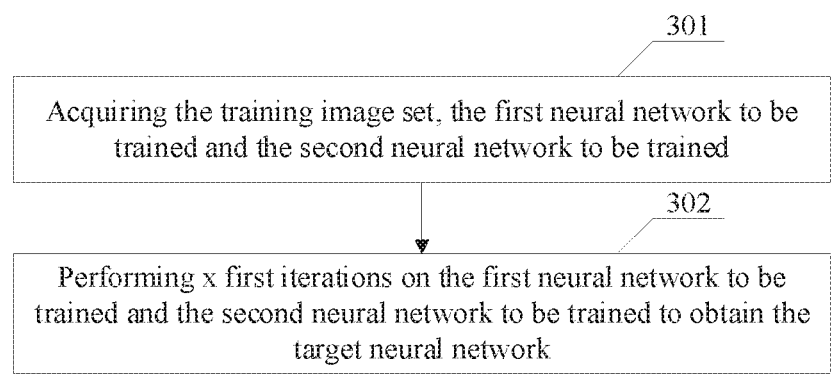
FIG. 3 is a flowchart of another image processing method according to an embodiment of the present disclosure.

The implementation of the training method according to the embodiments will be elaborated below. Please refer to FIG. 3 which is a flowchart of a possible implementation of 102 according to an embodiment of the present disclosure.

301. Obtaining the training image set, the first neural network to be trained and the second neural network to be trained.

Figure 4:
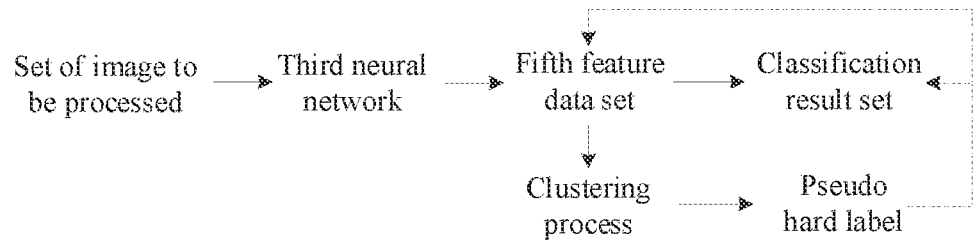
FIG. 4 is a diagram of another training method according to an embodiment of the present disclosure.

The execution subject of this embodiment may be a server or a computer. The execution subject of the training method according to this embodiment may be different from or the same as the afore-mentioned execution subject. In this embodiment, the training image set can be obtained through the conventional method shown in FIG. 4. As shown in FIG. 4, multiple unlabeled images on the target domain (hereinafter referred to as the set of image to be processed) are input into the third neural network trained on the source domain, and a feature extraction process is performed by the third neural network on images in the set of image to be processed so as to obtain a third feature data set containing feature data of images in the set of image to be processed, then feature data of images in the set of image to be processed are distinguished via a clustering algorithm so as to obtain a predetermined number of sets, and pseudo hard labels are added to images corresponding to the feature data in each set.

In one possible implementation, the training image set can be obtained by performing y second iterations on the third neural network, wherein y is a positive integer. The $t^{th}$ second iteration in the y iterations includes:

Obtaining a second image set from the set of image to be processed, and obtaining a third feature data set containing feature data of images in the second image set and a classification result set containing classification results of images in the second image set by processing images of the second image set by a third neural network for the $t^{th}$ second iteration; determining labels of feature data in the third feature data set by performing a clustering process on feature data of the third feature data set, and adding the labels of feature data of the third feature data set to corresponding images in the second image set, thereby obtaining a third image set; determining a third loss on the basis of the difference between the classification results in the classification result set and the labels of images in the third image set; and obtaining parameters of a third neural network for the $(t+_1)^{th}$ second iteration by adjusting the parameters of the third neural network for the $t^{th}$ second iteration according to the third loss.

In the $(t+1)^{th}$ second iteration, a third image set is obtained by sampling from the set of image to be processed, wherein images in the third image set are different from those in the second image set. With the manner of processing the second image set with third neural network for the $t^{th}$ second iteration to obtain labels of images in the second image set and parameters of the third neural network for the $(t+1)^{th}$ second iteration, labels of images in the third image set as well as a third neural network for the $(t+2)^{th}$ second iteration can be obtained by processing the third image set with the third neural network for the $(t+1)^{th}$ second iteration, until at least one image in the set of image to be processed is labeled and a training image set is obtained, wherein the third neural network for the first second iteration is the third neural network.

Take the first second iteration as an example (Example 3), five images containing human objects are sampled from the set of image to be processed, which are respectively referred as image a, image b, image c, image d and image e. These five images are input to the third neural network so as to obtain feature data of the five images, and the five images are divided into three classifications by a clustering algorithm according to the identities of the human objects represented by feature data of the five images, thereby obtaining three sets, namely, a first set consisting of image a and image e, a second set consisting of image b, and a third set consisting of image c and image d. The identity of the human object contained in the images of the first set is identified to be Zhang San, and a pseudo hard label [1, 0, 0] is respectively added to image a and image e, representing that the identities of the human objects in image a and image e both belong to a first classification (Zhang San). The identity of the human object contained in the image of the second set is identified to be Li Si, and a pseudo hard label [0, 1, 0] is added to image b, representing that the identity of the human object in image b belongs to a second classification (Li Si). The identity of the human object contained in the images of the third set is identified to be Wang Wu, and a pseudo hard label [0, 0, 1] is respectively added to image c and image d, representing that the identities of the human objects in image c and image d both belong to a third classification (Wang Wu).

At the same time, a classifier in the third neural network predicts a classification of an image (hereinafter referred to as a prediction result) according to feature data of these images, and will determine a total reserved hard classification loss according to the difference between the prediction result and the pseudo hard label.

In one possible implementation, the reserved hard classification loss is obtained by respectively calculating the difference between the prediction result and the label for each image in the set of image to be processed, and the total reserved hard classification loss can be determined by calculating the average value of the reserved hard classification loss of at least one image in the set of image to be processed. Further to Example 3 (Example 4), a predicted classification of image a output by a classifier in the third neural network is [0.7, 0.2, 0.1], representing that the probability that the identity of the human object in the image a is Zhang San is 0.7, the probability that the identity of the human object in image a is Li Si is 0.2, and the probability that the identity of the human object in image a is Wang Wu is 0.1. The reserved hard classification loss of image a can be determined through a calculation on a cross-entropy loss between the prediction classification ([0.7, 0.2, 0.1]) and the pseudo hard label ([1, 0, 0]). In the same way, the reserved hard classification losses of image b, image c, image d and image e can be determined, and then the average value of the reserved hard classification losses of image a, image b, image c, image d and image e can be calculated so as to obtain a total reserved hard classification loss.

At the same time, a reserved hard ternary loss of each image in the set of image to be processed is determined according to feature data of images in the set of image to be processed, and an average value of the reserved hard ternary loss of all images in the set of image to be processed is calculated so as to determine a total reserved hard ternary loss. Referring to Example 4 again, when calculating the reserved hard ternary loss of image a, a similarity between the feature data of an image belonging to the same classification as image a and the feature data of image a (hereinafter referred to as the positive similarity) is respectively calculated, then a similarity between the feature data of an image belonging to a different classifications from image a and feature data of image a (hereinafter referred to as the negative similarity) is respectively calculated, and the reserved hard ternary loss is determined according to the minimum value of the positive similarity and the maximum value of the negative similarity. In the same way, the reserved hard ternary losses of image b, image c, image d and image e can be determined, and then the average value of the reserved hard ternary losses of image a, image b, image c, image d and image e can be calculated so as to obtain a total reserved hard ternary loss.

Then, the total reserved hard classification loss and the total reserved hard ternary loss are weighted and summed so as to obtain a third loss; the parameters of the third neural network are adjusted on the basis of the third loss so as to obtain a third neural network for the $2^{nd}$ second iteration; until at least one image in the set of image to be processed is labeled (i.e. the pseudo hard label) and the training image set is obtained.

Both the first neural network to be trained and the second neural network to be trained are neural networks trained on the source domain, and both are neural networks capable of extracting feature data from images and classifying according to the feature data. The structure of the first neural network to be trained and the structure of the second neural network to be trained may be the same or different, which is not limited in the present disclosure.

302. Obtaining a target neural network by performing x first iterations on the first neural network to be trained and the second neural network to be trained.

Figure 5:
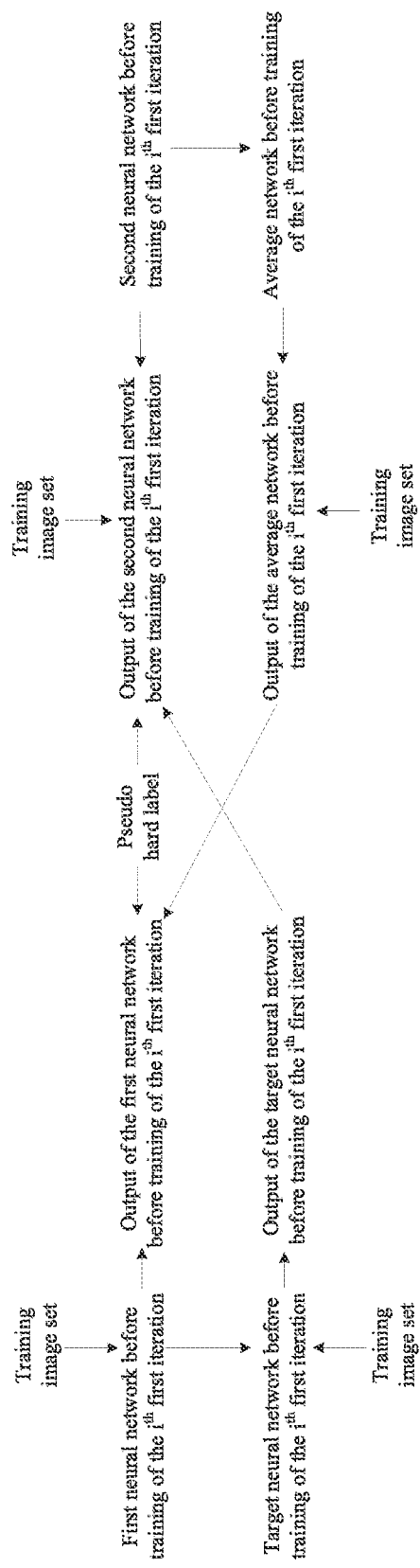
FIG. 5 is a diagram of a further training method according to an embodiment of the present disclosure.

Please refer to FIG. 5. FIG. 5 is a diagram of training provided by this embodiment of the $i^{th}$ first iteration in the afore-mentioned x iterations, wherein the $i^{th}$ first iteration includes: supervising the first neural network to be trained for the $i^{th}$ first iteration of x first iterations with the training image set and the output of the average network for the $i^{th}$ first iteration so as to obtain the first neural network to be trained for the $(i+1)^{th}$ first iteration; and supervising the second neural network to be trained for the $i^{th}$ first iteration with the training image set and the output of the target neural network for the $i^{th}$ first iteration so as to obtain the second neural network to be trained for the $(i+1)^{th}$ first iteration.

In one possible implementation, obtaining a first neural network to be trained for the $(i+1)^{th}$ first iteration by supervising the first neural network to be trained for the $i^{th}$ first iteration with the training image set and obtaining a second neural network to be trained for the $(i+1)^{th}$ first iteration by supervising the second neural network to be trained for the $i^{th}$ first iteration with the training image set may include the following: obtaining a first classification result by processing the first image with the first neural network to be trained for the $i^{th}$ first iteration, obtaining a second classification result by processing the first image with the average network for the $i^{th}$ first iteration, obtaining a third classification result by processing the first image with the second neural network to be trained for the $i^{th}$ first iteration, and obtaining a fourth classification result by processing the first image with the target neural network before the training of the $i^{th}$ first iteration. Then, a first hard classification loss of a first neural network to be trained for the $i^{th}$ first iteration is determined according to the different between the first classification result and a first label (the pseudo hard label obtained in Step 301) of the first image, and a second hard classification loss of a second neural network to be trained for the $i^{th}$ first iteration is determined according to the different between the third classification result and the first label. By supervising the first neural network to be trained for the $i^{th}$ first iteration with the first hard classification loss and supervising the second neural network to be trained for the $i^{th}$ first iteration with the second hard classification loss, a supervision with the training image set on the first neural network to be trained for the $i^{th}$ first iteration and the second neural network to be trained for the $i^{th}$ first iteration may be achieved. Determining a first soft classification loss of the first neural network to be trained for the $i^{th}$ first iteration according to the difference between the first classification result and the second classification result, and determining a second soft classification loss of the second neural network before the training of the $i^{th}$ first iteration according to the difference between the third classification result and the fourth classification result. By supervising the first neural network to be trained for the $i^{th}$ first iteration with the first soft classification loss and supervising the second neural network to be trained for the $i^{th}$ first iteration with the second soft classification loss, a supervision on the first neural network to be trained for the $i^{th}$ first iteration with the average network for the $i^{th}$ first iteration and a supervision on the second neural network to be trained for the $i^{th}$ first iteration with the target neural network for the $i^{th}$ first iteration may be achieved. Then, the first hard classification loss and the first soft classification loss are weighted and summed so as to obtain a first loss of the first neural network to be trained for the $i^{th}$ first iteration, and the second hard classification loss and the second soft classification loss are weighted and summed so as to obtain a second loss of the second neural network to be trained for the $i^{th}$ first iteration. Then, parameters of the first neural network to be trained for the $i^{th}$ first iteration is adjusted on the basis of the first loss so as to obtain a first neural network to be trained for the $(i+1)^{th}$ first iteration. Parameters of the second neural network to be trained for the $i^{th}$ first iteration is adjusted on the basis of the second loss so as to obtain a second neural network to be trained for the $(i+1)^{th}$ first iteration. Before the $i^{th}$ first iteration, parameters of the target neural network for the $i^{th}$ first iteration can be determined according to parameters of a target neural network for the $(i-1)^{th}$ first iteration and parameters of the first neural network to be trained for the $i^{th}$ first iteration, and parameters of the average network for the $i^{th}$ first iteration can be determined according to parameters of an average network for the $(i-1)^{th}$ first iteration and parameters of the second neural network to be trained for the $i^{th}$ first iteration. In one possible implementation, in the $(i+1)^{th}$ first iteration, parameters of the target neural network for the $(i+1)^{th}$ first iteration and parameters of the average network for the $(i+1)^{th}$ first iteration can be respectively determined according to the following two formulas:

$$E^{i+1}(\theta_1) = \alpha E^i(\theta_1) + (1-\alpha)\theta_1^{i+1} \quad \text{Formula (2)}$$

$$E^{i+1}(\theta_2) = \alpha E^i(\theta_2) + (1-\alpha)\theta_2^{i+1} \quad \text{Formula (3)}$$

Wherein: $E^{i+1}(\theta_1)$ is the parameter of the target neural network for the $(i+1)^{th}$ first iteration. $E^i(\theta_1)$ is the parameter of the target neural network for the $i^{th}$ first iteration, $E^{i+1}(\theta_2)$ is the parameter of the average network for the $(i+1)^{th}$ first iteration, and $E^i(\theta_2)$ is the parameter of the average network for the $i^{th}$ first iteration; $\theta_1^{i+1}$ is the parameter of the first neural network to be trained for the $(i+1)^{th}$ first iteration, and $\theta_2^{i+1}$ is the parameter of the second neural network to be trained for the $(i+1)^{th}$ first iteration. $\alpha$ is a natural number greater than or equal to 0 and less than 1, $E^2(\theta_1) = E^1(\theta_1) = \theta_1^1$, and $E^2(\theta_2) = E^1(\theta_2) = \theta_2^1$; x is a positive integer, and i is a positive integer less than or equal to x.

Executing the $(i+1)^{th}$ first iteration after determining the parameters of the first neural network to be trained for the $(i+1)^{th}$ first iteration, the parameters of the second neural network to be trained for the $(i+1)^{th}$ first iteration, the parameters of the target neural network for the $(i+1)^{th}$ first iteration and the parameters of the average network for the $(i+1)^{th}$ first iteration. After executing the $x^{th}$ first iteration, the parameters of a target neural network of the $x^{th}$ first iteration is adjusted so as to obtain the target neural network.

Take the $1^{st}$ first iteration as an example, suppose that the training image set contains image 1, image 2 and image 3, wherein the pseudo hard label of image 1 is [1, 0], then the classification result obtained by processing image 1 (i.e. the first image) in the training image set with a first neural network to be trained for the $1^1$ first iteration (i.e. the first neural network to be trained) is [0.7, 0.3], the classification result obtained by processing image 1 with a second neural network to be trained for the $1^4$ first iteration (i.e. the second neural network to be trained) is [0.8,0.2], the classification result obtained by processing image 1 with a target neural network for the $1^{st}$ first iteration (i.e. the first neural network to be trained) is [0.7, 0.3], and the classification result obtained by processing image 1 with an average network for the $1^4$ first iteration (i.e. the second neural network to be trained) is [0.8,0.2]. The cross-entropy loss between [1,0] and [0.7,0.3] is calculated so as to obtain a first hard classification loss, the cross-entropy loss between [1,0] and [0.8,0.2] is calculated so as to obtain a second hard classification loss, the difference between [0.7,0.3] and [0.7,0.3] is calculated so as to obtain a first soft classification loss, and the difference between [0.8,0.2] and [0.8,0.2] is calculated so as to obtain a second soft classification loss. Then, the first hard classification loss and the first soft classification loss are weighted and summed so as to obtain a first loss, and the second hard classification loss and the second soft classification loss are weighted and summed so as to obtain a second loss. The parameters of the first neural network to be trained is adjusted on the basis of the first loss so as to obtain a first neural network to be trained for the $2^{nd}$ first iteration, and the parameters of the second neural network to be trained is adjusted on the basis of the second loss so as to obtain a second neural network to be trained for the $2^{nd}$ first iteration.

Optionally, in the $i^{th}$ first iteration, before the first hard classification loss and the first soft classification loss are weighed and summed to obtain the first loss and before the second hard classification loss and the second soft classification loss are weighed and summed to obtain the second loss, a first hard ternary loss of a first neural network to be trained for the $i^{th}$ first iteration, as well as a second hard ternary loss of a second neural network to be trained for the $i^{th}$ first iteration can also be determined. Then, the first hard classification loss, the first soft classification loss and the first hard ternary loss are weighted and summed so as to obtain a first loss, and the second hard classification loss, the second soft classification loss and the second hard ternary loss are weighted and summed so as to obtain a second loss.

In one possible implementation, a first feature data set is obtained by processing the training image set with the first neural network to be trained for the $i^{th}$ first iteration, and a fourth feature data set is obtained by processing the training image set with the second neural network to be trained for the $i^{th}$ first iteration. A first similarity is obtained by determining the minimum similarity between a first feature data of the first image in the first feature data set and the feature data of the positive sample feature data subset in the first feature data set, and a ninth similarity is obtained by determining the minimum similarity between a third feature data of the first image in the fourth feature data set and the feature data of the positive sample feature data subset in the fourth feature data set. A third similarity is obtained by determining the maximum similarity between the first feature data and the feature data of the negative sample feature data subset in the first feature data set, and a tenth similarity is obtained by determining the maximum similarity between the third feature data and the feature data of the negative sample feature data subset in the fourth feature data set. Then, a first hard ternary loss can be determined according to the first similarity and the third similarity, and a second hard ternary loss can be determined according to the ninth similarity and the tenth similarity, wherein the negative sample feature data subset includes feature data of images having different labels from the first label, and the positive sample feature data subset includes feature data of images having the same label as a first label.

For example (Example 5), the training image set contains image 1, image 2, image 3, image 4 and image 5, wherein the labels of image 1, image 3 and image 5 are Zhang San, and the labels of image 2 and image 4 are Li Si. The first feature data set contains the feature data of image 1 (the first feature data), the feature data of image 2 (hereinafter referred to as feature data 2), the feature data of image 3 (hereinafter referred to as feature data 3), the feature data of image 4 (hereinafter referred to as feature data 4) and the feature data of image 5 (hereinafter referred to as feature data 5). The fourth feature data set contains the feature data of image 1 (the third feature data), the feature data of image 2 (hereinafter referred to as feature data 6), the feature data of image 3 (hereinafter referred to as feature data 7), the feature data of image 4 (hereinafter referred to as feature data 8) and the feature data of image 5 (hereinafter referred to as feature data 9). The positive sample feature data subset in the first feature data set contains the feature data 3 and the feature data 5, and the negative sample feature data subset in the first feature data set contains the feature data 2 and the feature data 4. The positive sample feature data subset in the fourth feature data set contains the feature data 7 and the feature data 9, and the negative sample feature data subset in the fourth feature data set contains the feature data 6 and the feature data 8. The similarities between the first feature data and the feature data 2, the feature data 3, the feature data 4 and the feature data 5 are respectively calculated. Suppose that the similarity between the first feature data and the feature data 3 is smaller than that between the first feature data and the feature data 5, then the similarity between the first feature data and the feature data 3 is the first similarity. Suppose that the similarity between the first feature data and the feature data 2 is smaller than that between the first feature data and the feature data 4, then the similarity between the first feature data and the feature data 4 is the third similarity. The similarities between the third feature data and the feature data 6, the feature data 7, the feature data 8 and the feature data 9 are respectively calculated. Suppose that the similarity between the third feature data and the feature data 7 is smaller than that between the third feature data and the feature data 9, then the similarity between the third feature data and the feature data 7 is the ninth similarity. Suppose that the similarity between the third feature data and the feature data 6 is smaller than that between the third feature data and the feature data 8, the similarity between the third feature data and the feature data 8 is the tenth similarity. The first hard ternary loss among the first feature data, the feature data 3 and the feature data 4 can be determined according to Formula (4), and the second hard ternary loss among the second feature data, the feature data 7 and the feature data 8 can be determined according to Formula (5):

$$L_1 = \max(0, d_1 + m - d_3) \qquad \text{Formula (4)}$$

$$L_2 = \max(0, d_9 + m - d_{10}) \qquad \text{Formula (5)}$$

Wherein: max (A, B) is the maximum value of A and B, $d_1$ is the first similarity, d is the third similarity, $d_9$ is the ninth similarity, $d_{10}$ is the tenth similarity, and m is a natural number greater than 0 and less than 1.

The feature data in the positive sample feature data subset with a minimum similarity to the first feature data is referred as the intra-class hardest feature data of the first feature data, and the feature data in the negative sample feature data subset with a maximum similarity to the first feature data is referred as the out-of-class hardest feature data of the first feature data. Similarly, for the feature data of other images (including image 2, image 3, image 4 and image 5) of the training image set in the first feature data set, the intra-class hardest feature data and the out-of-class hardest feature data in the positive sample feature data subset in the first feature data subset can be determined, thereby determining the hard ternary loss of the first neural network to be trained for each image according to the feature data, the intra-class hardest feature data and the out-of-class hardest feature data in the first feature data set for that image. Similarly, the hard ternary loss of the second neural network to be trained for each image can be determined according to the feature data, the intra-class hardest feature data and the out-of-class hardest feature data in the first feature data set for that image in the training image set.

Optionally, after the hard ternary loss of the first neural network to be trained and the hard ternary loss of the second neural network to be trained for each image in the training image set have been determined, the average value of the hard ternary loss of the first neural network to be trained for at least one image in the training image set is taken as the first hard ternary loss, and the average value of the hard ternary loss of the second neural network to be trained for at least one image in the training image set is taken as the second hard ternary loss.

The first neural network to be trained for the $i^{th}$ first iteration is supervised by the first hard ternary loss so that the first neural network to be trained for the $i^{th}$ first iteration will increase the similarity between feature data of images of the same classification and reduce the similarity between feature data of images of different classifications, thereby distinguishing images of different classifications better and enhancing the recognition accuracy of image classifications. Similarly, the second neural network to be trained for the $i^{th}$ first iteration is supervised by the second hard ternary loss so that the effect of extracting features from images by the second neural network to be trained for the $i^{th}$ first iteration can be improved, thereby obtaining feature data with more image information.

In this embodiment, the first loss is determined according to the first hard classification loss, the first soft classification loss and the first hard ternary, and the second loss is determined according to the second hard classification loss, the second soft classification loss and the second hard ternary. Then, the first neural network to be trained for the $i^{th}$ first iteration is adjusted based on the first loss, and the second neural network to be trained for the $i^{th}$ first iteration is adjusted based on the second loss, so that the first neural network to be trained for the $i^{th}$ first iteration is supervised by the training images and the average network for the $i^{th}$ first iteration, and the second neural network to be trained for the $i^{th}$ first iteration is supervised by the training images and the target network before the training of the $i^{th}$ first iteration.

As for the $i^{th}$ iteration in this embodiment, the positive sample feature data subset and the negative sample feature data subset are determined through labels of images in the training image set, the labels being the pseudo hard labels obtained through the traditional method in Step 301. Since the pseudo hard labels are data processed by one-hot encoding, which means that the value in the pseudo hard label is either 0 or 1, large errors may exist in the pseudo hard labels, as a result, large errors also exist in the positive sample feature data subset and the negative sample feature data subset determined through the pseudo hard labels, which further causes a poor feature extraction effect on the target domain by the first neural network to be trained for the $(i+1)^{th}$ first iteration obtained after the $i^{th}$ first iteration, resulting in a low recognition accuracy on the target domain.

For example (Example 6), labels of images in the training image set contain two classifications (Zhang San and Li Si). Since the values of the pseudo hard labels are either 0 or 1, the human object in the images of the training image set is either Zhang San or Li Si. Suppose that the human object in image 1 of the training image set is Zhang San, the classification represented by the pseudo hard label of image 1 is Zhang San, and the human object in image 2 is Li Si, but the classification represented by the pseudo hard label of image 2 is Zhang San, the human object in image 3 is Zhang San, but the classification represented by the pseudo hard label of image 3 is Li Si. The feature data of image 1 in the first feature data set is feature data a, the feature data of image 2 in the first feature data set is feature data b, and the feature data of image 3 in the first feature data set is feature data c. The intra-class hardest feature data for feature data a is feature data b, and the out-of-class hardest feature data for feature data a is feature data c. The first hard ternary loss determined by feature data a, feature data b, and feature data c supervises the first neural network to be trained for the $i^{th}$ first iteration to adjust the first neural network to be trained for the $i^{th}$ first iteration, so that the first neural network to be trained for the $i^{th}$ first iteration can increase the similarity between feature data extracted from image 1 and feature data extracted from image 2, and reduce the similarity between feature data extracted from image 1 and feature data extracted from image 3 so as to obtain the first neural network to be trained for the $(i+1)^{th}$ first iteration. The human object in image 1 (Zhang San) and the human object in image 2 (Li Si) are not the same one. If the similarity between feature data of image 1 and feature data of image 2 is increased, it will obviously result in low recognition accuracy for Zhang San or Li Si by the first neural network to be trained for the $(i+1)^{th}$ first iteration. Similarly, the human object in image 1 (Zhang San) and the human object in image 3 (Zhang San) are the same one. If the similarity between feature data of image 1 and feature data of image 3 is lowered, it will obviously result in low recognition accuracy for Zhang San or Li Si by the first neural network to be trained for the $(i+1)^{th}$ first iteration.

In order to reduce the impact of the pseudo hard labels such as those in Example 6, the present disclosure provides a method for obtaining the first soft ternary loss by supervising the first neural network to be trained for the $i^{th}$ first iteration through soft labels. The first neural network to be trained for the $i^{th}$ first iteration is supervised by the first soft ternary loss so as to enhance the recognition accuracy of the first-neural network to be trained for the $(i+1)^{th}$ first iteration, thereby improving the recognition accuracy of the target neural network.

Figure 6:
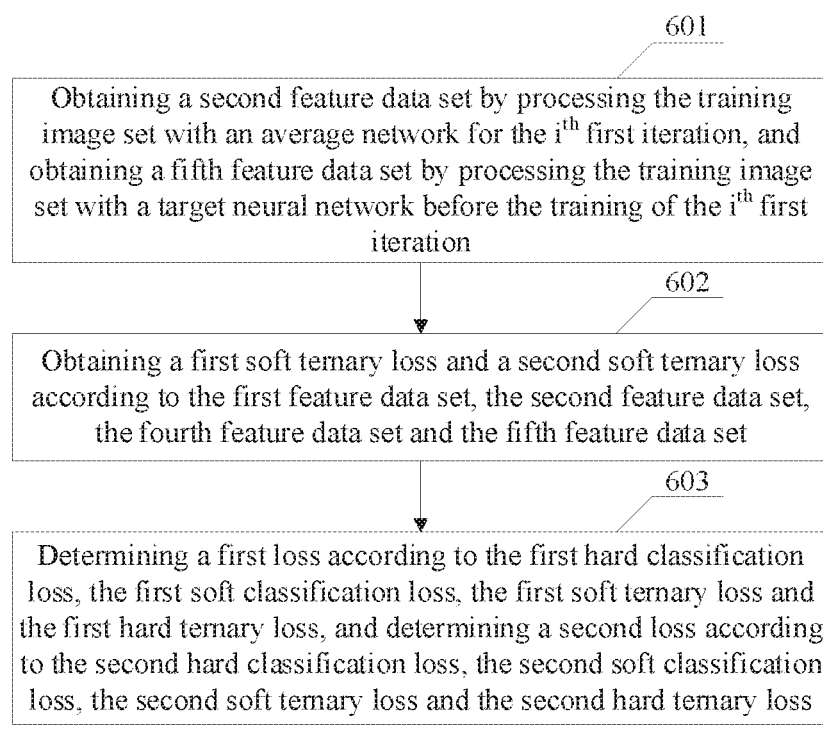
FIG. 6 is a flowchart of another image processing method according to an embodiment of the present disclosure.

Please refer to FIG. 6 which is a flowchart of another image processing method according to an embodiment of the present disclosure.

601. Obtaining a second feature data set by processing the training image set with an average network for the $i^{th}$ first iteration, and obtaining a fifth feature data set by processing the training image set with a target neural network before the training of the $i^{th}$ first iteration.

602. Obtaining a first soft ternary loss and a second soft ternary loss according to the first feature data set, the second feature data set, the fourth feature data set and the fifth feature data set.

Obtaining a second similarity by determining the minimum similarity between the second feature data of the first image in the second feature data set and the feature data of the positive sample feature data subset in the second feature data set, and obtaining a fourth similarity by determining the maximum similarity between the second feature data and feature data of the negative sample feature data subset in the second feature data set. Obtaining an eleventh similarity by determining the minimum similarity between the fourth feature data of the first image in the fifth feature data set and feature data of the positive sample feature data subset in the fifth feature data set, and obtaining a twelfth similarity by determining the maximum similarity between the fourth feature data and feature data of the negative sample feature data subset in the fifth feature data set.

It should be understood that, in the embodiments of the present disclosure, feature data contained in the positive sample feature data subsets in different feature data sets are different, and feature data contained in the negative sample feature data subsets in different feature data sets are different too.

Since the values in the pseudo hard labels are either 0 or 1, the classification of the images in the training image set is "over-absolute", which further results in a poor feature extraction effect on the target domain by the first neural network to be trained for the $(i+1)^{th}$ first iteration. Through respective normalizations on the first similarity, the second similarity, the third similarity, the fourth similarity, the ninth similarity, the tenth similarity, the eleventh similarity and the twelfth similarity, in the present embodiment, the first similarity, the second similarity, the third similarity, the fourth similarity, the ninth similarity, the tenth similarity, the eleventh similarity and twelfth similarity are converted to values between 0 and 1, and a first soft ternary loss of the first neural network to be trained for the $i^{th}$ first iteration and a second soft ternary loss of the second neural network to be trained for the $i^{th}$ first iteration are determined from the differences between the similarities after the normalizations, so as to improve the effect of feature extraction on the target domain by the first neural network to be trained for the $(i+1)^{th}$ first iteration.

In one possible implementation, a first total similarity is obtained by determining a sum of the second similarity and the fourth similarity, a second total similarity is obtained by determining a sum of the first similarity and the third similarity, a third total similarity is obtained by determining a sum of the ninth similarity and the tenth similarity, and a fourth total similarity is obtained by determining a sum of the eleventh similarity and the twelfth similarity. A fifth similarity is obtained by calculating a quotient of the second similarity divided by the first total similarity, a sixth similarity is obtained by calculating a quotient of the fourth similarity divided by the first total similarity, a seventh similarity is obtained by calculating a quotient of the first similarity divided by the second total similarity, an eighth similarity is obtained by calculating a quotient of the third similarity divided by the second total similarity, a thirteenth similarity is obtained by calculating a quotient of the ninth similarity divided by the third total similarity, a fourteenth similarity is obtained by calculating a quotient of the tenth similarity divided by the second total similarity, a fifteenth similarity is obtained by calculating a quotient of the eleventh similarity divided by the fourth total similarity, and a sixteenth similarity is obtained by calculating a quotient of the twelfth similarity divided by the fourth total similarity. The normalizations on the first similarity, the second similarity, the third similarity, the fourth similarity, the ninth similarity, the tenth similarity, the eleventh similarity and the twelfth similarity are completed. The parameters of the first neural network to be trained for the $i^{th}$ first iteration are adjusted by taking the fifth similarity and the sixth similarity as the supervision data (i.e. the soft labels) for the first neural network to be trained for the $i^{th}$ first iteration, and the parameters of the second neural network to be trained for the $i^{th}$ first iteration are adjusted by taking the fifteenth similarity and the sixteenth similarity as the supervision data (i.e. the soft labels) for the second neural network to be trained for the $i^{th}$ first iteration. Namely, the first soft ternary loss is determined according to the difference between the fifth similarity and the seventh similarity as well as the difference between the sixth similarity and the eighth similarity, and the second soft ternary loss is determined according to the difference between the thirteenth similarity and the fifteenth similarity as well as the difference between the fourteenth similarity and the sixteenth similarity.

Optionally, the soft ternary loss of the average network for the $i^{th}$ first iteration of each image is determined according to the similarity between the intra-class hardest feature data in the second feature data set of each image in the training image set and the feature data of each image in the second feature data set, as well as the similarity between the out-of-class hardest feature data in the second feature data set and the feature data of each image in the second feature data set. The soft ternary loss of the target neural network for the $i^{th}$ first iteration of each image is determined according to the similarity between the intra-class hardest feature data in the fifth feature data set of each image in the training image set and the feature data of each image in the fifth feature data set, as well as the similarity between the out-of-class hardest feature data in the fifth feature data set and the feature data of each image in the fifth feature data set. Then, the average value of the soft ternary loss of the average network for the $i^{th}$ first iteration for at least one image in the training image set is calculated to obtain the first soft ternary loss, and the average value of the soft ternary loss of the target neural network for the $i^{th}$ first iteration for at least one image in the training image set is calculated to obtain the second soft ternary loss.

The similarity, which is obtained by normalizing the first similarity, the second similarity, the third similarity, the fourth similarity, the ninth similarity, the tenth similarity, the eleventh similarity and twelfth similarity, is from 0 to 1, and is closer to the real data distribution than the pseudo hard labels. Therefore, the normalized similarities can serve as supervision data so as to enhance the recognition accuracy of the target neural network.

For example, the set of image to be processed contains 10 images, and, after the processing in Step 401, the images in the set of image to be processed are divided as Zhang San and Li Si according to the identities of the human objects in the images of the set of image to be processed, wherein there are five images of which the pseudo hard label of human object identity is Zhang San (hereinafter referred to as first-class images), and five images of which the pseudo hard label of human object identity is Li Si (hereinafter referred to as second-class images). However, the real identity of the human object of image 1 in the first-class images is Li Si, and the real identity of the human object of image 2 in the second-class images is Zhang San. In other words, in the first-class images, there are 4 images of which the human object identity is Zhang San, and one image of which the human object identity is Li Si, so the real label distribution of first-class images should be [0.8, 0.2], wherein [0.8, 0.2] represents that in the total number of first-class images the proportion of the number of images of which the human object identity is Zhang San is 0.8, and that in the total number of first-class images the proportion of the number of images of which the human object identity is Li Si is 0.2. Similarly, the real label distribution of second-class images should be [0.2, 0.8], wherein [0.2, 0.8] represents that in the total number of second-class images the proportion of the number of images of which the human object identity is Zhang San is 0.2, and that in the total number of second-class images the proportion of the number of images of which the human object identity is Li Si is 0.8. But the pseudo hard label of first-class images is [1, 0], and the pseudo hard label of second-class images is [0, 1], which are obviously not consistent with the real label contribution of first-class images and the real label distribution of second-class images. The soft label obtained by using the method according to the embodiment is a value between 0 and 1, and is closer to the real label contribution of first-class images and the real label distribution of second-class images. As a result, by taking the soft labels as the supervision data for supervising the first neural network to be trained for the $i^{th}$ first iteration and the second neural network to be trained for the $i^{th}$ first iteration, the final effect of feature extraction on the target domain by the target neural network can be enhanced. Optionally, the similarity in the embodiments of the present disclosure may be Euclidean distance or cosine similarity, which is not limited in the present disclosure.

Optionally, before the training image set is input into the first neural network to be trained for the $i^{th}$ first iteration, the second neural network to be trained for the $i^{th}$ first iteration, the target neural network for the $i^{th}$ first iteration and the average network for the $i^{th}$ first iteration, a first pre-processing can be performed on the images in the training image set so as to obtain a first image set; then the first image set is input into the first neural network to be trained for the $i^{th}$ first iteration to obtain the first feature data set, and the first image set is input into the target neural network for the $i^{th}$ first iteration to obtain the fifth feature data set, wherein the first pre-processing includes any one of an erasing process, a trimming process and a reversing process.

Through the first pre-processing on the training image set, the probability of over-fitting during the training in the first neural network to be trained for the $i^{th}$ first iteration, the second neural network to be trained for the $i^{th}$ first iteration, the target neural network for the $i^{th}$ first iteration and the average network for the $i^{th}$ first iteration can be lowered.

Optionally, while the first pre-processing is performed on the training image set, a second pre-processing can also be performed on the training image set to obtain a fourth image set, wherein the second pre-processing includes any one of an erasing process, a trimming process and a reversing process. A fourth image set is input into the second neural network to be trained for the $i^{th}$ first iteration to obtain a fourth feature data set, and the fourth image set is input into the average network for the $i^{th}$ first iteration to obtain a second feature data set.

By performing the first pre-processing and the second pre-processing on the training image set at the same time, the probability of over-fitting during the training in the first neural network to be trained for the $i^{th}$ first iteration, the second neural network to be trained for the $i^{th}$ first iteration, the target neural network for the $i^{th}$ first iteration and the average network for the $i^{th}$ first iteration can be further lowered.

For example (Example 7), the training image set contains image 1 and image 2, image 3 is obtained by trimming image 1, image 4 is obtained by erasing image 2 (any area of image 2), and image 3 and image 4 serve as a first image set. Image 5 is obtained by reversing image 1, image 6 is obtained by trimming image 2, and image 5 and image 6 serve as a fourth image set. Obtain a first feature data set containing feature data of image 3 and feature data of image 4 by inputting image 3 and image 4 into the first neural network to be trained for the $i^{th}$ first iteration, obtain a fifth feature data set containing feature data of image 3 and feature data of image 4 by inputting image 3 and image 4 into the target neural network for the $i^{th}$ first iteration, obtain a fourth feature data set containing feature data of image 5 and feature data of image 6 by inputting image 5 and image 6 into the second neural network to be trained for the $i^{th}$ first iteration, and obtain a second feature data set containing feature data of image 5 and feature data of image 6 by inputting image 5 and image 6 into the first neural network to be trained for the $i^{th}$ first iteration.

Perform a first pre-processing on the first image in the training image set so as to obtain a second image, and perform a second pre-processing on the first image so as to obtain a fourth image, wherein the image content of the second image and that of the fourth image are different, but the label of the second image is the same as that of the fourth image. Still take Example 7 as an example, the label of image 1, the label of image 3 and the label of image 5 are all the same, and the label of image 2, the label of image 4 and the label of image 6 are all the same.

Obtain a first classification result by processing the second image with the first neural network to be trained for the $i^{th}$ first iteration, obtain a fourth classification result by processing the second image with the target neural network for the $i^{th}$ first iteration, obtain a third classification result by processing the fourth image with the second neural network to be trained for the $i^{th}$ first iteration, and obtain a second classification result by processing the second image with the average network for the $i^{th}$ first iteration.

Feature data in the first feature data set obtained by processing the first image set with the first neural network to be trained for the $i^{th}$ first iteration is different from the feature data in the feature data in the first feature data set obtained by processing the training image set with the first neural network to be trained for the $i^{th}$ first iteration. At this moment, the afore-mentioned intra-class hardest feature data in the first feature data set (or the second feature data set, the fourth feature data set or the fifth feature data set) for images in the training image set refers to the intra-class hardest feature data in the first feature data set (or the second feature data set, the fourth feature data set or the fifth feature data set) for images processed by the first or second pre-processing, and the out-of-class hardest feature data in the first feature data set (or the second feature data set, the fourth feature data set or the fifth feature data set) for images in the training image set refers to the out-of-class hardest feature data in the first feature data set (or the second feature data set or the fourth feature data set or the fifth feature data set) for images processed by the first or second pre-processing.

It should be understood that, in the embodiments of the present disclosure, the first neural network to be trained, the first neural network and the first neural network to be trained for the $i^{th}$ first iteration have the same structure but different parameters; the second neural network to be trained, the second neural network and the second neural network to be trained for the $i^{th}$ first iteration have the same structure but different parameters; the target network and the target neural network for the $i^{th}$ first iteration have the same structure but different parameters; and the average network and the average neural network before the training of the $i^{th}$ first iteration have the same structure but different parameters. As shown in FIG. 4, the output of the first neural network to be trained for the $i^{th}$ first iteration contains the first classification result and the first feature data set, the output of the target neural network for the $i^{th}$ first iteration contains the fourth classification result and the fifth feature data set, the output of the second neural network to be trained for the $i^{th}$ first iteration contains the third classification result and the fourth feature data set, and the output of the average network for the $i^{th}$ first iteration contains the second classification result and the second feature data set.

Optionally, if due to insufficient hardware resources of the device implementing the technical solution provided by the present disclosure it is not possible to process at least one image in the training image set in one first iteration or second iteration, a sample image set may be obtained by sampling from the training image set, and can be used as training data for the one first iteration or the one second iteration.

603. Determining a first loss according to the first hard classification loss, the first soft classification loss, the first soft ternary loss and the first hard ternary loss, and determining a second loss according to the second hard classification loss, the second soft classification loss, the second soft ternary loss and the second hard ternary loss.

The first hard classification loss, the first soft classification loss, the first soft ternary loss and the first hard ternary loss are weighted and summed to obtained the first loss, and the second hard classification loss, the second soft classification loss, the second soft ternary loss and the second hard ternary loss are weighted and summed to obtained the second loss, wherein the weights for the weighted summing can be adjusted according to the actual usage, which is not limited in this disclosure.

By using the technical solution according to an embodiment, soft labels can be obtained according to the first feature data set, the second feature data set, the fourth feature data set and the fifth feature data set, and can be used for supervising the first neural network to be trained for the $i^{th}$ first iteration and the second neural network to be trained for the $i^{th}$ first iteration so as obtain the first soft ternary loss and the second soft ternary loss. Adjust the parameters of the first neural network to be trained for the $i^{th}$ iteration on the basis of the first soft ternary loss so as to obtain the first neural network to be trained for the $(i+1)^{th}$ iteration, and adjust the second neural network to be trained for the $i^{th}$ iteration on the basis of the second soft ternary loss, thereby enhancing the recognition accuracy of the first neural network to be trained for the $(i+1)^{th}$ iteration on the target domain and the effect of feature extraction by the second neural network to be trained for the $(i+1)^{th}$ iteration on the target domain, which can further enhance the recognition accuracy of the target neural network on the target domain.

The present embodiment of disclosure also provides an application of image search performed on the basis of the target feature data of an image to be processed obtained on the basis of the embodiment. That is, the target feature data is used to search a database so as to obtain an image having feature data matching the target feature data and serving as the target image.

The database can be established before acquiring the image to be processed and includes images and feature data of the images, wherein the feature data of images are relevant to the task executed by the target neural network on the target domain. For example, the target neural network can be used for recognizing the identity of a human object of an image in the target domain, and the feature data of image include features of the human object in the image, such as the clothing attributes, appearance features and other features that can be used for recognizing the human object's identity. Clothing attributes include at least one of the features of articles decorating the human body (such as the colors of tops, the colors of trousers, trouser length, hat styles, shoe colors, presence or absence of umbrellas, luggage types, presence or absence of masks, mask colors). Appearance features include body shapes, genders, hairstyles, hair colors, ages, presence or absence of glasses, and presence or absence of something in front of the chest. Other features that can be used for recognizing the identity of a human object include: posture, angles of view, stride lengths and ambient brightness. For another example, the target neural network can be used for recognizing which one of an apple, a pear and a peach is included in the image of the target domain, wherein the feature data of images include apple feature information, pear feature information or peach feature information.

Since each image in the database has feature data, the target feature data is used for searching in the database so as to determine the feature data matching the target feature data from the database, which is to determine the similarity between the target feature data and the image feature data in the database, and to take the feature data of the image, whose similarity reaches the threshold, as the feature data matching the target feature data, thereby determining the target image. It should be understood that the number of target images can be one or more.

One skilled in the art can understand that the writing order of the steps in the specific implementation of the above method does not refer to a strict execution order limiting the implementation process, and the specific execution order of the steps should be determined on the basis of its function and possible internal logics.

Afore-mentioned is the methods according to the embodiments of the present disclosure, and following is the devices disclosed in the embodiments of the present disclosure.

Figure 7:
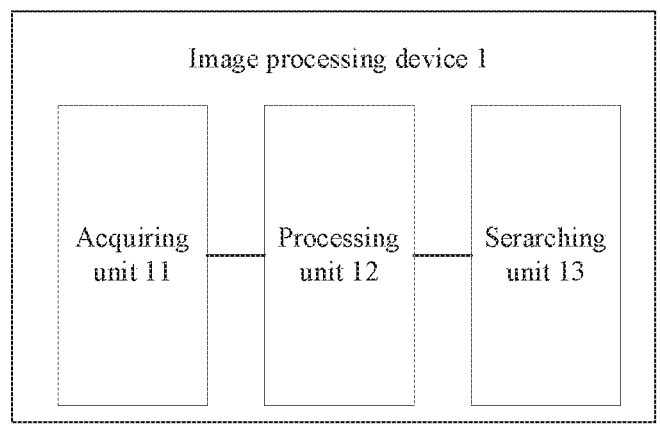
FIG. 7 is a structural diagram of an image processing device according to an embodiment of the present disclosure.

Please refer to FIG. 7, which is a diagram of an image processing device according to an embodiment of the present disclosure, wherein the device 1 comprises: an acquiring unit 11, a processing unit 12 and a searching unit 13:

an acquiring unit 11 for acquiring an image to be processed; and a feature extraction processing unit 112 for performing feature extraction processing on the image to be processed using a target neural network so as to obtain target feature data of the image to be processed, wherein parameters of the target neural network are time average values of parameters of a first neural network which is obtained from training under supervision by a training image set and an average network, and parameters of the average network are time average values of parameters of a second neural network which is obtained from training under supervision by the training image set and the target neural network.

In one possible implementation, obtaining the first neural network from training under supervision by a training image set and an average network includes: obtaining the training image set, a first neural network to be trained and a second neural network to be trained; and performing x first iterations on the first neural network to be trained and second neural network to be trained so as to obtain the first neural network and the second neural network, wherein x is a positive integer; the $i^{th}$ first iteration of the x first iterations includes: supervising the first neural network to be trained for the $i^{th}$ first iteration with the training image set and an output of the average network for the $i^{th}$ first iteration so as to obtain the first neural network to be trained for the $(i+1)^{th}$ first iteration, and supervising the second neural network to be trained for the $i^{th}$ first iteration with the training image set and an output of the target neural network for the $i^{th}$ first iteration so as to obtain the second neural network to be trained for the $(i+1)^{th}$ first iteration; parameters of the target neural network are time average values of parameters of the first neural network, including determining the parameters of the target neural network for the $i^{th}$ first iteration according to the parameters of the target neural network for the $(i-1)^{th}$ first iteration and the parameters of the first neural network to be trained for the $i^{th}$ first iteration, wherein i is a positive integer less than or equal to x; when i=1, parameters of the target neural network for the $(i-1)^{th}$ first iteration are the same as parameters of the first neural network to be trained.

In another possible implementation, obtaining the first neural network to be trained for the $(i+1)^{th}$ first iteration by supervising the first neural network to be trained for the $i^{th}$ first iteration with the training image set and an output of the average network for the $i^{th}$ first iteration includes: obtaining a first feature data set by processing the training image set with the first neural network to be trained for the $i^{th}$ first iteration obtaining a second feature data set by processing the training image set with the average network for the $i^{th}$ first iteration; obtaining a first soft ternary loss according to the first feature data set and the second feature data set; and obtaining the first neural network to be trained for the $(i+1)^{th}$ first iteration by supervising the first neural network to be trained for the $i^{th}$ first iteration with the training image set and the first soft ternary loss.

In another possible implementation, obtaining the first soft ternary loss according to the first feature data set and the second feature data set includes obtaining a first similarity by determining a minimum similarity between first feature data of a first image of the training image set in the first feature data set and feature data of a positive sample feature data subset in the first feature data set, obtaining a second similarity by determining a minimum similarity between second feature data of the first image in the second feature data set and feature data of the positive sample feature data subset in the second feature data set, wherein the positive sample feature data subset including feature data of images having the same label as a first label of the first image; obtaining a third similarity by determining a maximum similarity between the first feature data and feature data of a negative sample feature data subset in the first feature data set, obtaining a fourth similarity by determining a maximum similarity between the second feature data and feature data of the negative sample feature data subset in the second feature data set, wherein the negative sample feature data subset including feature data of images having different labels from the first label; obtaining a fifth similarity, a sixth similarity, a seventh similarity and an eighth similarity by normalizations on the first similarity, the second similarity, the third similarity and the fourth similarity respectively; and obtaining the first soft ternary loss according to the fifth similarity, the sixth similarity, the seventh similarity and the eighth similarity.

In another possible implementation, the obtaining a fifth similarity, a sixth similarity, a seventh similarity and an eighth similarity respectively by normalizations on the first similarity, the second similarity, the third similarity and the fourth similarity includes obtaining a first total similarity by determining a sum of the second similarity and the fourth similarity, obtaining a second total similarity by determining a sum of the first similarity and the third similarity; obtaining the fifth similarity by determining a quotient of the second similarity divided by the first total similarity, obtaining the sixth similarity by determining a quotient of the fourth similarity divided by the first total similarity; and obtaining the seventh similarity by determining a quotient of the first similarity divided by the second total similarity, obtaining the eighth similarity by determining a quotient of the third similarity divided by the second total similarity.

In another possible implementation, obtaining the first neural network to be trained for the $(i+1)^{th}$ first iteration by supervising the first neural network to be trained for the $i^{th}$ first iteration with the training image set and the first soft ternary loss includes obtaining a first classification result by processing the first image with the first neural network to be trained for the $i^{th}$ first iteration; determining a first loss for the first neural network to be trained for the $i^{th}$ first iteration according to the first classification result, the first label and the first soft ternary loss; and obtaining the first neural network to be trained for the $(i+1)^{th}$ first iteration by adjusting the parameters of the first neural network to be trained for the $i^{th}$ first iteration based on the first loss.

In another possible implementation, determining the first loss for the first neural network to be trained for the $i^{th}$ first iteration according to the first classification result, the first label and the first soft ternary loss includes determining a first hard classification loss according to a difference between the first classification result and the first label; and determining the first loss according to the first hard classification loss and the first soft ternary loss.

In another possible implementation, prior to determining the first loss according to the first hard classification loss and the first soft ternary loss, the method also includes obtaining a second classification result by processing the first image with the average network for the $i^1$ first iteration; and determining a first soft classification loss according to a difference between the first classification result and the second classification result; wherein determining the first loss according to the first hard classification loss and the first soft ternary loss includes determining the first loss according to the first hard classification loss, the first soft classification loss and the first soft ternary loss.

In another possible implementation, prior to determining the first loss according to the first hard classification loss, the first soft classification loss and the first soft ternary loss, the method also includes determining a first hard ternary loss according to the first similarity and the third similarity; and determining the first loss according to the first hard classification loss, the first soft classification loss and the first soft ternary loss includes determining the first loss according to the first hard classification loss, the first soft classification loss, the first soft ternary loss and the first hard ternary loss.

In another possible implementation, obtaining the first classification result by processing the first image of the training image set with the first neural network to be trained for the $i^{th}$ first iteration includes obtaining a first image set from a first pre-processing on the training image set, wherein the first pre-processing includes any one of an erasing process, a trimming process and a reversing process; and obtaining the first classification result by processing a second image in the first image set with the first neural network to be trained for the $i^{th}$ first iteration, wherein the second image is obtained from the first pre-processing on the first image, and feature data of the second image in the first feature data set are the same as feature data of the first image in the first feature data set.

In another possible implementation, obtaining the first feature data set by processing the training image set with the first neural network to be trained for the $i^{th}$ first iteration includes obtaining the first feature data set by processing the first image set with the first neural network to be trained for the $i^{th}$ first iteration.

In another possible implementation, the acquiring unit 11 is specifically used for: acquiring the set of image to be processed and a third neural network; obtaining the training image set by performing y second iterations on the third neural network, wherein y is a positive integer; a $t^{th}$ second iteration of the y second iterations includes: obtaining a second image set by sampling from the set of image to be processed, obtaining a third feature data set containing feature data of images in the second image set and a classification result set containing classification results of images in the second image set by processing the images in the second image set with the third neural network for the $t^{th}$ second iteration; determining labels of feature data in the third feature data set by a clustering process on feature data in the third feature data set, adding labels of feature data in the third feature data set to corresponding images in the second image set to obtain a third image set; determining a third loss on the basis of a difference between the classification results in the classification result set and the labels of images in the third image set; and obtaining parameters of the third neural network for the $(t+1)^{th}$ second iteration by adjusting parameters of the third neural network for the $t^{th}$ second iteration on the basis of the third loss, wherein t is a positive integer less than y.

In another possible implementation, the device also includes: a searching unit 13 for obtaining an image serving as a target image by searching the database for the target feature data, the image having feature data matching with the target feature data.

In the present embodiment, the parameters of the target neural network and the parameters of the average network are respectively obtained by determining the time average value of the parameters of the first neural network and the time average value of the second neural network, and then an output of the target neural network is used for supervising the second neural network and an output of the average network is used for supervising the first neural network so as to train the target neural network, thereby improving the training effects. Furthermore, when the target neural network is used for executing related recognition tasks on the target domain, target feature data with more information capable of enhancing the recognition accuracy on the target domain can be extracted.

In some embodiments, the device according to an embodiment of the present disclosure has functions or contains modules for executing the methods described in the above method embodiments. For specific implementation, please refer to the description of the above method embodiments. No more details will be provided here for the sake of brevity.

Figure 8:
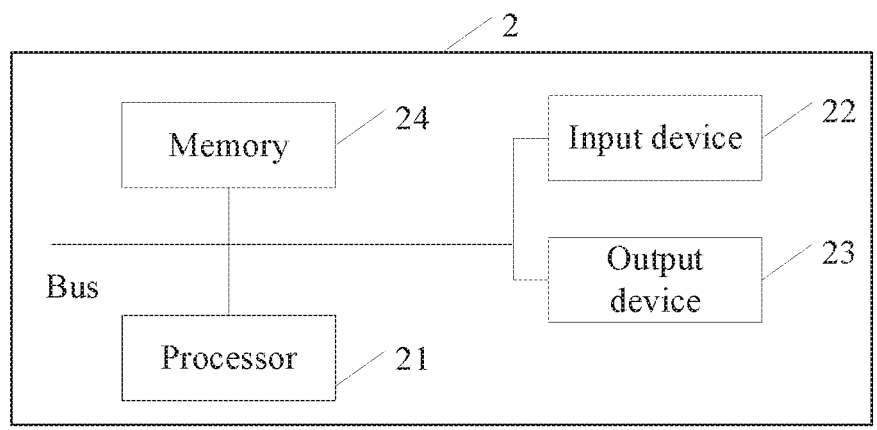
FIG. 8 is a hardware structural diagram of an image processing device according to an embodiment of the present disclosure.

FIG. 8 is a structural diagram of hardware of an image processing device according to an embodiment of the present disclosure. The image processing device 2 includes a processor 21, a memory 22, an input device 23 and an output device 24. The processor 21, the memory 22, the input device 23 and the output device 24 are coupled through a connector including various interfaces, transmission lines or buses, etc., which is not limited in this embodiment of the present disclosure. It should be understood that, in various embodiments of the present disclosure, coupling refers to mutual connection in a specific manner, including direct connection or indirect connection through other devices, such as connection through various interfaces, transmission lines, buses and so on.

The processor 21 may be one or more graphics processing units (GPU). When the processor 21 is a GPU, the GPU may be a single-core GPU or a multi-core GPU. Optionally, the processor 21 may be a processing unit group composed of multiple GPUs, and the multiple processors are coupled to each other through one or more buses. Optionally, the processor may also be other types of processing units, which are not limited in this embodiment of the present disclosure.

The memory 22 can be used for storing computer program instructions and for executing various computer program codes including program codes in the solution of the present disclosure. Optionally, the memory includes but is not limited to random access memory (RAM), read-only memory (ROM), erasable programmable read-only memory (EPROM)) or compact disc read-only memory (CD-ROM), and is applied to related instructions and data.

The input device 23 is used for inputting data and/or signals, and the output device 24 is used for outputting data and/or signals. The output device 23 and the input device 24 may be independent devices or an integrated device.

Understandably, in this embodiment of the present disclosure, the memory 22 can be used for storing not only related instructions but also related images. For example, the memory 22 can be used for storing the neural to-be-searched network obtained through the input device 23, or the memory 22 can also be used for storing the target neural network obtained through searching by the processor 21, or the like. This embodiment of the present disclosure does not limit the data specifically stored in the memory.

It can be understood that FIG. 8 merely shows a simplified design of an image processing device. Practically, the image processing device may also include other necessary elements, including but not limited to any number of input/output devices, processors, memory and so on, and all image processing devices that can implement the embodiments of the present disclosure are within the protection scope of the present disclosure.

One skilled in the art may realize that the exemplary units and algorithm steps described with reference to the embodiments disclosed in this text can be implemented by electronic hardware, or a combination of computer software and electronic hardware. It depends on specific application and design constraints of the technical solution as for whether these functions are executed in hardware or software. Professional technicians can use different methods to realize the described functions for each specific application, but such realization should not be considered as going beyond the scope of the present disclosure.

One skilled in the art is clear that, for the sake of convenient and concise description, please refer to corresponding process in the afore-mentioned method embodiments for specific working process of the above system, device, and units, and details will not be described here again. One skilled in the art can also understand that the description of each embodiment of the present disclosure has its own emphasis. For the sake of convenient and concise description, identical or similar parts may not be repeated in different embodiments. Therefore, please refer to the descriptions of other embodiments for the parts that are not described or elaborated in a certain embodiment.

It should be understood that, the system, device and method disclosed in the embodiments of the present disclosure may be realized in other ways. For example, the afore-mentioned device embodiments are merely schematic. For instance, the division of the units is only a division of logical functions. In actual implementation, there may be other division ways, e.g., multiple units or components may be combined with or integrated into another system, or some features can be ignored, or not executed. In addition, the shown or discussed mutual coupling or direct coupling or communication connection may be indirect coupling or communication connection through some interfaces, devices or units, or may be in electrical, mechanical or other forms.

The units described as separate components may or may not be physically separated, and the components shown as units may or may not be physical units, namely, they may be located in one place or may be distributed on multiple network units. Some or all of the units may be selected according to actual needs to achieve the purpose of the solution of this embodiment.

Besides, each functional unit in the embodiments of the present disclosure may be integrated into one processing unit or may exist individually and physical, or in a way that two or more units are integrated into a single unit.

The above embodiments can be implemented in whole or in part by software, hardware, firmware or any combination thereof. When software is used, it can be implemented in whole or in part in the form of a computer program product, wherein the computer program product includes one or more computer instructions. When the computer program instructions are loaded and executed on a computer, the processes or functions according to the embodiments of the present disclosure are generated in whole or in part. The computer may be a general-purpose computer, a dedicated computer, a computer network or other programmable devices. The computer instructions may be stored in a computer-readable storage medium, or be transmitted through the computer-readable storage medium. The computer instructions can be sent from a website, computer, server or data center to another website, computer, server or data center in wired (such as coaxial cable, optical fiber, digital subscriber line (DSL)) or wireless (such as infrared, wireless, microwave, etc.) manners. The computer-readable storage medium may be any available medium that can be accessed by a computer or a data storage device including a server, a data center or the like integrated by one or more available media. The available medium may be a magnetic medium (for example, a floppy disk, a hard disk, a magnetic tape), an optical medium (for example, a digital versatile disc (DVD)), or a semiconductor medium (for example, solid state disk (SSD)) and so on.

One skilled in the art can understand that all or part of the process in the method of the above embodiment can be realized by related hardware instructed by a computer program. The program can be stored in a computer-readable storage medium, and may include the processes of the foregoing method embodiments when the program is executed. The foregoing storage medium include: read-only memory (ROM) or random access memory (RAM), magnetic disks, optical disks and other media that can store program codes.

What is claimed is:

1. An image processing method, including:
   acquiring an image to be processed; and
   performing a feature extraction process with a target neural network on the image to be processed, to obtain target feature data of the image to be processed, wherein parameters of the target neural network are time average values of parameters of a first neural network which is obtained from training under supervision by a training image set and an average network, and parameters of the average network are time average values of parameters of a second neural network which is obtained from training under supervision by the training image set and the target neural network.

2. The image processing method according to claim 1, wherein obtaining the first neural network from training under supervision by the training image set and the average network includes:
   obtaining the training image set, the first neural network to be trained and the second neural network to be trained; and
   performing x first iterations on the first neural network to be trained and the second neural network to be trained to obtain the first neural network and the second neural network, wherein x is a positive integer;
   an $i^{th}$ first iteration of the x first iterations includes:
   supervising the first neural network to be trained for the $i^{th}$ first iteration with the training image set and an output of the average network for the $i^{th}$ first iteration to obtain the first neural network to be trained for the $(i+1)^{th}$ first iteration, supervising the second neural network to be trained for the $i^{th}$ first iteration with the training image set and an output of the target neural network for the $i^{th}$ first iteration to obtain the second neural network to be trained for the $(i+1)^{th}$ first iteration;
   wherein the method further comprising:
   determining the parameters of the target neural network for the $i^{th}$ first iteration according to the parameters of the target neural network for the $(i-1)^{th}$ first iteration and the parameters of the first neural network to be trained for the $i^{th}$ first iteration, wherein i is a positive integer less than or equal to x; and
   when i=1, the parameters of the target neural network for the $(i-1)^{th}$ first iteration are the same as the parameters of the first neural network to be trained.

3. The image processing method according to claim 2, wherein obtaining the first neural network to be trained for the $(i+1)^{th}$ first iteration by supervising the first neural network to be trained for the $i^{th}$ first iteration with the training image set and an output of the average network for the $i^{th}$ first iteration includes:
   obtaining a first feature data set by processing the training image set with the first neural network to be trained for the $i^{th}$ first iteration, obtaining a second feature data set by processing the training image set with the average network for the $i^{th}$ first iteration;
   obtaining a first soft ternary loss according to the first feature data set and the second feature data set; and
   obtaining the first neural network to be trained for the $(i+1)^{th}$ first iteration by supervising the first neural network to be trained for the $i^{th}$ first iteration with the training image set and the first soft ternary loss.

4. The image processing method according to claim 3, wherein obtaining the first soft ternary loss according to the first feature data set and the second feature data set includes:
   obtaining a first similarity by determining a minimum similarity between first feature data of a first image of the training image set in the first feature data set and feature data of a positive sample feature data subset in the first feature data set, obtaining a second similarity by determining a minimum similarity between second feature data of the first image in the second feature data set and feature data of the positive sample feature data subset in the second feature data set, wherein the positive sample feature data subset including feature data of images having the same label as a first label of the first image;
   obtaining a third similarity by determining a maximum similarity between the first feature data and feature data of a negative sample feature data subset in the first feature data set, obtaining a fourth similarity by determining a maximum similarity between the second feature data and feature data of the negative sample feature data subset in the second feature data set, wherein the negative sample feature data subset including feature data of images having different labels from the first label;
   obtaining a fifth similarity, a sixth similarity, a seventh similarity and an eighth similarity by normalizations on the first similarity, the second similarity, the third similarity and the fourth similarity respectively; and
   obtaining the first soft ternary loss according to the fifth similarity, the sixth similarity, the seventh similarity and the eighth similarity.

5. The image processing method according to claim 4, wherein obtaining the fifth similarity, the sixth similarity, the seventh similarity and the eighth similarity respectively by normalizations on the first similarity, the second similarity, the third similarity and the fourth similarity including:
   obtaining a first total similarity by determining a sum of the second similarity and the fourth similarity, obtaining a second total similarity by determining a sum of the first similarity and the third similarity;
   obtaining the fifth similarity by determining a quotient of the second similarity divided by the first total similarity, obtaining the sixth similarity by determining a quotient of the fourth similarity divided by the first total similarity; and
   obtaining the seventh similarity by determining a quotient of the first similarity divided by the second total similarity, obtaining the eighth similarity by determining a quotient of the third similarity divided by the second total similarity.

6. The image processing method according to claim 5, wherein obtaining the first neural network to be trained for the $(i+1)^{th}$ first iteration by supervising the first neural network to be trained for the $i^{th}$ first iteration with the training image set and the first soft ternary loss includes:
   obtaining a first classification result by processing the first image with the first neural network to be trained for the $i^{th}$ first iteration;
   determining a first loss for the first neural network to be trained for the $i^{th}$ first iteration according to the first classification result, the first label and the first soft ternary loss; and
   obtaining the first neural network to be trained for the $(i+1)^{th}$ first iteration by adjusting the parameters of the first neural network to be trained for the $i^{th}$ first iteration based on the first loss.

7. The image processing method according to claim 6, wherein determining the first loss for the first neural network to be trained for the $i^{th}$ first iteration according to the first classification result, the first label and the first soft ternary loss includes:
   determining a first hard classification loss according to a difference between the first classification result and the first label; and
   determining the first loss according to the first hard classification loss and the first soft ternary loss.

8. The image processing method according to claim 7, wherein, prior to determining the first loss according to the first hard classification loss and the first soft ternary loss, the method also includes:
   obtaining a second classification result by processing the first image with the average network for the $i^{th}$ first iteration; and
   determining a first soft classification loss according to a difference between the first classification result and the second classification result;
   wherein determining the first loss according to the first hard classification loss and the first soft ternary loss includes:
   determining the first loss according to the first hard classification loss, the first soft classification loss and the first soft ternary loss.

9. The image processing method according to claim 8, wherein, prior to determining the first loss according to the first hard classification loss, the first soft classification loss and the first soft ternary loss, the method also includes:
   determining a first hard ternary loss according to the first similarity and the third similarity;
   wherein determining the first loss according to the first hard classification loss, the first soft classification loss and the first soft ternary loss includes:
   determining the first loss according to the first hard classification loss, the first soft classification loss, the first soft ternary loss and the first hard ternary loss.

10. The image processing method according to claim 5, wherein obtaining the first classification result by processing the first image of the training image set with the first neural network to be trained for the $i^{th}$ first iteration includes:
   obtaining a first image set from a first pre-processing on the training image set, wherein the first pre-processing includes any one of an erasing process, a trimming process and a reversing process; and
   obtaining the first classification result by processing a second image in the first image set with the first neural network to be trained for the i th first iteration, wherein the second image is obtained from the first pre-processing on the first image, and feature data of the second image in the first feature data set are the same as feature data of the first image in the first feature data set.

11. The image processing method according to claim 10, wherein obtaining the first feature data set by processing the training image set with the first neural network to be trained for the $i^{th}$ first iteration includes:
   obtaining the first feature data set by processing the first image set with the first neural network to be trained for the $i^{th}$ first iteration.

12. The image processing method according to claim 2, wherein obtaining the training image set includes:
   acquiring a set of image to be processed and a third neural network;
   obtaining the training image set by performing y second iterations on the third neural network, wherein y is a positive integer;
   a $t^{th}$ second iteration of the y second iterations includes:
   obtaining a second image set by sampling from the set of image to be processed, obtaining a third feature data set containing feature data of images in the second image set and a classification result set containing classification results of images in the second image set by processing the images in the second image set with the third neural network for the t th second iteration;
   determining labels of feature data in the third feature data set by a clustering process on feature data in the third feature data set, adding labels of the feature data in the third feature data set to corresponding images in the second image set to obtain a third image set;
   determining a third loss on the basis of difference between the classification results in the classification result set and the labels of images in the third image set; and
   obtaining parameters of the third neural network for the $(t+1)^{th}$ second iteration by adjusting the parameters of the third neural network for the $t^{th}$ second iteration on the basis of the third loss, wherein t is a positive integer less than y.

13. The image processing method according to claim 1, wherein the method also includes:
   obtaining, by searching a database with the target feature data, an image having feature data matching the target feature data as a target image.

14. The image processing method according to claim 1, wherein the image to be processed contains human objects.

15. An image processing device, comprising:
   a processor; and
   a memory configured to store processor-executable instructions;
   wherein the processor is configured to invoke the instructions stored on the memory to:
   acquire an image to be processed; and
   perform a feature extraction process with a target neural network on the image to be processed to obtain target feature data of the image to be processed, wherein parameters of the target neural network are time average values of parameters of a first neural network which is obtained from training under supervision by a training image set and an average network, and parameters of the average network are time average values of parameters of a second neural network which is obtained from training under supervision by the training image set and the target neural network.

16. The image processing device according to claim 15, wherein obtaining the first neural network from training under supervision by a training image set and an average network includes:

obtaining the training image set, the first neural network to be trained and the second neural network to be trained; and performing x first iterations on the first neural network to be trained and the second neural network to be trained to obtain the first neural network and the second neural network, wherein x is a positive integer;

the $i^{th}$ first iteration of x first iterations includes:

supervising the first neural network to be trained for the $i^{th}$ first iteration with the training image set and an output of the average network for the $i^{th}$ first iteration to obtain the first neural network to be trained for the $(i+1)^{th}$ first iteration, supervising the second neural network to be trained for the $i^{th}$ first iteration with the training image set and an output of the target neural network for the $i^{th}$ first iteration to obtain the second neural network to be trained for the $(i+1)^{th}$ first iteration;

wherein the processor is further configured to:

determine the parameters of the target neural network for the i th first iteration according to the parameters of the target neural network for the $(i-1)^{th}$ first iteration and the parameters of the first neural network to be trained for the $i^{th}$ first iteration, wherein i is a positive integer less than or equal to x;

when i=1, the parameters of the target neural network for the $(i-1)^{th}$ first iteration are the same as the parameters of the first neural network to be trained.

17. The image processing device according to claim 16, wherein obtaining the first neural network to be trained for the $(i+1)^{th}$ first iteration by supervising the first neural network to be trained for the $i^{th}$ first iteration with the training image set and an output of the average network for the $i^{th}$ first iteration includes:

obtaining a first feature data set by processing the training image set with the first neural network to be trained for the $i^{th}$ first iteration, obtaining a second feature data set by processing the training image set with the average network for the $i^{th}$ first iteration;

obtaining a first soft ternary loss according to the first feature data set and the second feature data set; and obtaining the first neural network to be trained for the $(i+1)^{th}$ first iteration by supervising the first neural network to be trained for the $i^{th}$ first iteration with a the training image set and the first soft ternary loss.

18. The image processing device according to claim 17, wherein obtaining the first soft ternary loss according to the first feature data set and the second feature data set includes:

obtaining a first similarity by determining a minimum similarity between first feature data of a first image of the training image set in the first feature data set and feature data of a positive sample feature data subset in the first feature data set, obtaining a second similarity by determining a minimum similarity between second feature data of the first image in the second feature data set and feature data of the positive sample feature data subset in the second feature data set, wherein the positive sample feature data subset includes feature data of images having the same label as a first label of the first image;

obtaining a third similarity by determining a maximum similarity between the first feature data and feature data of a negative sample feature data subset in the first feature data set, obtaining a fourth similarity by determining a maximum similarity between the second feature data and feature data of the negative sample feature data subset in the second feature data set, wherein the negative sample feature data subset includes feature data of images having different labels from the first label;

obtaining a fifth similarity, a sixth similarity, a seventh similarity and an eighth similarity by normalizations on the first similarity, the second similarity, the third similarity and the fourth similarity respectively; and obtaining the first soft ternary loss according to the fifth similarity, the sixth similarity, the seventh similarity and the eighth similarity.

19. The image processing device according to claim 16, wherein the processor is further configured to:

acquire a set of image to be processed and a third neural network;

obtain the training image set by performing y second iterations on the third neural network, wherein y is a positive integer;

a $t^{th}$ second iteration of the v second iterations includes:

obtaining a second image set by sampling from the set of image to be processed, obtaining a third feature data set containing feature data of images in the second image set and a classification result set containing classification results of images in the second image set by processing the images in the second image set with the third neural network for the t th second iteration;

determining labels of feature data in the third feature data set by a clustering process on feature data in the third feature data set, adding labels of feature data in the third feature data set to corresponding images in the second image set to obtain a third image set;

determining a third loss on the basis of a difference between the classification results in the classification result set and the labels of images in the third image set; and obtaining parameters of the third neural network for the $(t+1)^{th}$ second iteration by adjusting parameters of the third neural network for the $t^{th}$ second iteration on the basis of the third loss, wherein t is a positive integer less than y.

20. A non-transitory computer-readable storage medium storing computer program instructions thereon, wherein when the computer program instructions are executed by a processor of an electronic apparatus, the processor is caused to:

acquire an image to be processed; and perform a feature extraction process with a target neural network on the image to be processed to obtain target feature data of the image to be processed, wherein parameters of the target neural network are time average values of parameters of a first neural network which is obtained from training under supervision by a training image set and an average network, and parameters of the average network are time average values of parameters of a second neural network which is obtained from training under supervision by the training image set and the target neural network.

* * * * *